(12) United States Patent
Pavlovic et al.

(10) Patent No.: US 8,935,886 B2
(45) Date of Patent: Jan. 20, 2015

(54) WINDOW REGULATOR MODULE HAVING CARRIER PLATE FORCING ARCUATE RAILS TO ACQUIRE HELICAL TWIST

(71) Applicant: Magna Closures Inc., Newmarket (CA)

(72) Inventors: Milos Pavlovic, Newmarket (CA); Vesna Pavlovic, Newmarket (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 14/105,333

(22) Filed: Dec. 13, 2013

(65) Prior Publication Data

US 2014/0102007 A1    Apr. 17, 2014

Related U.S. Application Data

(63) Continuation of application No. PCT/CA2012/000761, filed on Aug. 15, 2012.

(60) Provisional application No. 61/523,696, filed on Aug. 15, 2011.

(51) Int. Cl.
  *E05F 11/48* (2006.01)
(52) U.S. Cl.
  USPC .............................................. 49/352; 49/349
(58) Field of Classification Search
  USPC .................... 49/348, 349, 350, 351, 352, 502
  See application file for complete search history.

(56) References Cited

U.S. PATENT DOCUMENTS

| 4,785,585 | A | | 11/1988 | Grier et al. |
| 5,174,066 | A | | 12/1992 | Dupuy |
| 5,351,443 | A | | 10/1994 | Kimura et al. |
| 5,715,630 | A | * | 2/1998 | Szerdahelyi et al. ........... 49/351 |
| 5,884,434 | A | * | 3/1999 | Dedrich et al. ................. 49/503 |
| 5,927,021 | A | | 7/1999 | Kowalski et al. |
| 6,931,791 | B1 | * | 8/2005 | Pleiss .............................. 49/502 |
| 6,979,047 | B2 | | 12/2005 | Lin et al. |
| 7,231,717 | B2 | | 6/2007 | Wurm et al. |
| 7,877,932 | B2 | * | 2/2011 | Kriese et al. .................... 49/352 |
| 2007/0271849 | A1 | * | 11/2007 | Kriese et al. .................... 49/348 |
| 2007/0296245 | A1 | * | 12/2007 | Kriese et al. .................. 296/155 |
| 2008/0022601 | A1 | * | 1/2008 | Smith ............................. 49/502 |

OTHER PUBLICATIONS

International Search Report dated Nov. 16, 2012 issued from the Canadian Intellectual Property Office relating to PCT International Application No. PCT/CA2012/000761.

* cited by examiner

*Primary Examiner* — Jerry Redman
(74) *Attorney, Agent, or Firm* — Grant Tisdall; Gowling Lafleur Henderson LLP

(57) ABSTRACT

In an aspect, a window regulator module kit is provided, comprising a guide rail having substantially no helical twist, a carrier plate having a selected mounting arrangement configured to bring the guide rail to a selected helically twisted position when the guide rail is mounted to the carrier plate, a lifter mountable to the guide rail, wherein the lifter is configured to hold a window glass, and a cable drive assembly connectable to the lifter so as to slide the lifter along the arcuate rail.

6 Claims, 15 Drawing Sheets

WINDOW REGULATOR MODULE HAVING CARRIER PLATE FORCING ARCUATE RAILS TO ACQUIRE HELICAL TWIST

CROSS-REFERENCE

This application is a Continuation Application of PCT International Application No. PCT/CA2012/000761, filed Aug. 15, 2012 which claims the benefit of U.S. Provisional Patent Application No. 61/523,696, filed Aug. 15, 2011, the disclosure of which is incorporated by reference as if fully set forth in detail herein.

FIELD

This disclosure relates to the field of vehicular window regulators and window regulator modules that include a carrier and a window regulator.

BACKGROUND

In a conventional window regulator for a vehicle door, a window glass is moved up and down between a closed position where the window glass closes an aperture in the vehicle door and an open position where the window glass is lowered into a compartment formed in the vehicle door. The window glass usually rides or slides in fore and aft glass run channels that are installed in the vehicle door. The window regulator further includes one or more guide rails. Each guide rail has a lifter thereon that holds a lower edge of the window glass. The lifter is moved up and down on the guide rail between an upper position corresponding to the closed position of the window glass and a lower position corresponding to the open position of the window glass. A cable drive assembly is typically provided for driving the one or more lifters upward or downward on the one or more guide rails.

Some vehicles, however, have relatively complex shapes and as a result the guide rails may incorporate some amount of helical twist to guide the movement of the window glass through a complex motion between its closed and open positions. The amount of helical twist incorporated to guide the complex motion, may differ between a first guide rail positioned towards a front edge of the window glass, and a second guide rail positioned towards a rear edge of the window glass.

Providing a plurality of individually formed guide rails can increase the cost of the window regulator however. It would be advantageous to provide a way to provide a window regulator that addresses the issue of cost.

SUMMARY

In an aspect, a method of manufacturing a window regulator module for moving a window glass between open and closed positions in a vehicle door, is provided, comprising:
a) providing a guide rail having substantially no helical twist;
b) providing a carrier plate;
c) mounting the guide rail to the carrier plate, wherein the carrier plate holds the guide rail in a selected helically twisted position;
d) mounting a lifter to the guide rail, wherein the lifter is configured to hold the window glass; and
e) connecting a cable drive assembly to the lifter to permit driving of the lifter along the guide rail.

In another aspect, a window regulator module kit is provided, comprising a guide rail having substantially no helical twist, a carrier plate having a selected mounting arrangement configured to bring the guide rail to a selected helically twisted position when the guide rail is mounted to the carrier plate, a lifter mountable to the guide rail, wherein the lifter is configured to hold a window glass, and a cable drive assembly connectable to the lifter so as to slide the lifter along the arcuate rail.

BRIEF DESCRIPTION OF THE DRAWINGS

The foregoing and other aspects will be more readily appreciated having reference to the drawings, wherein.

DETAILED DESCRIPTION

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1A:
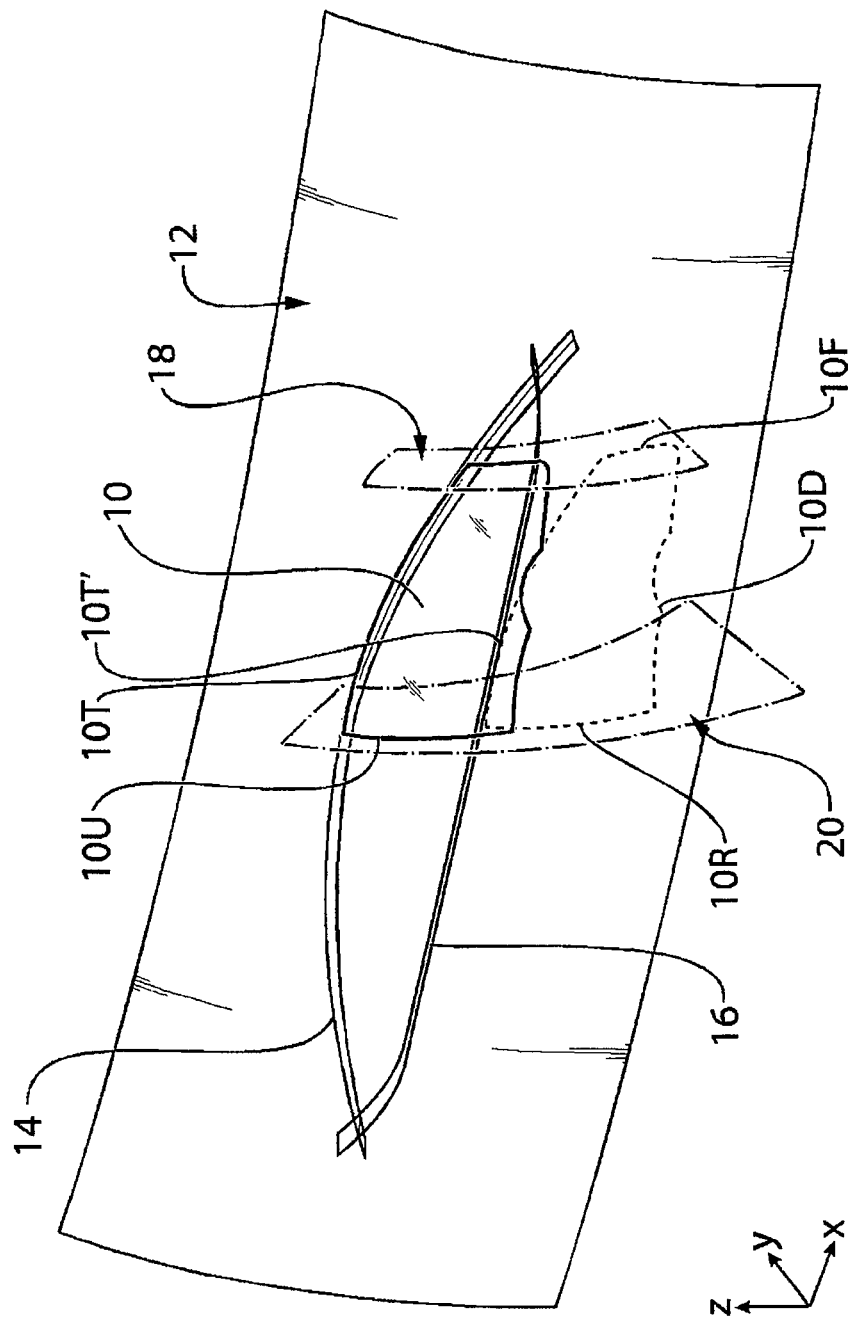
FIG. 1A is a perspective view illustration of surfaces constraining the shape and travel path of a window glass on a vehicle used for configuring a window regulator module.
Figure 1B:
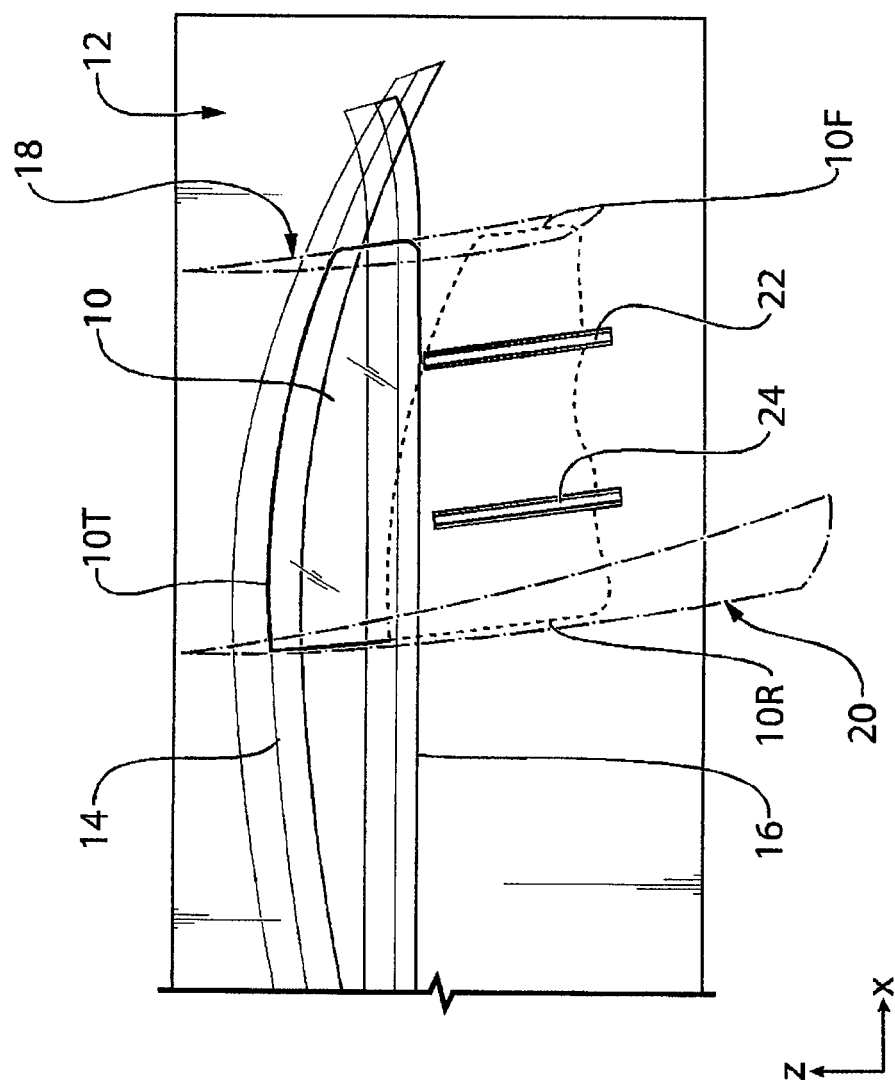
FIG. 1B is another perspective view of the surfaces shown in FIG. 1A.

FIGS. 1A and 1B are representations of some surfaces that are provided by a vehicle manufacturer to a supplier of a window regulator module (including at least a carrier plate and a window regulator) for a vehicle door (not shown). The surfaces define a shape of a window aperture in the vehicle door and thereby provide a basis for selecting the shape of a window glass 10 that fills the window aperture when in a closed position. The surfaces also constrain a movement of a window glass 10 between a closed position (represented by the solid window glass outline shown at 10U) and an open position (represented by a dashed window glass outline shown at 10D).

The surfaces may include, for example, a Class A surface 12 that defines a surface contour for the vehicle body (not shown). A top edge surface 14 is provided which represents the top edge of the window aperture. A bottom edge surface 16 is provided which represents a bottom edge of the window aperture. A forward edge surface 18 is provided and defines the forward edge of the window aperture and constrains the movement of the forward edge of the window glass 10 between the open and closed positions. A rear edge surface 20 is provided and defines the rear edge of the window aperture and constrains the movement of the rear edge of the window glass 10 between the open and closed positions. When the window glass 10 is in the closed position, the top edge of the window glass (shown at 10T) lies adjacent top edge surface 14. When the window glass 10 is in the open position, the top edge of the window glass (shown at 10T') may lie below the bottom edge surface 16.

Figure 2:
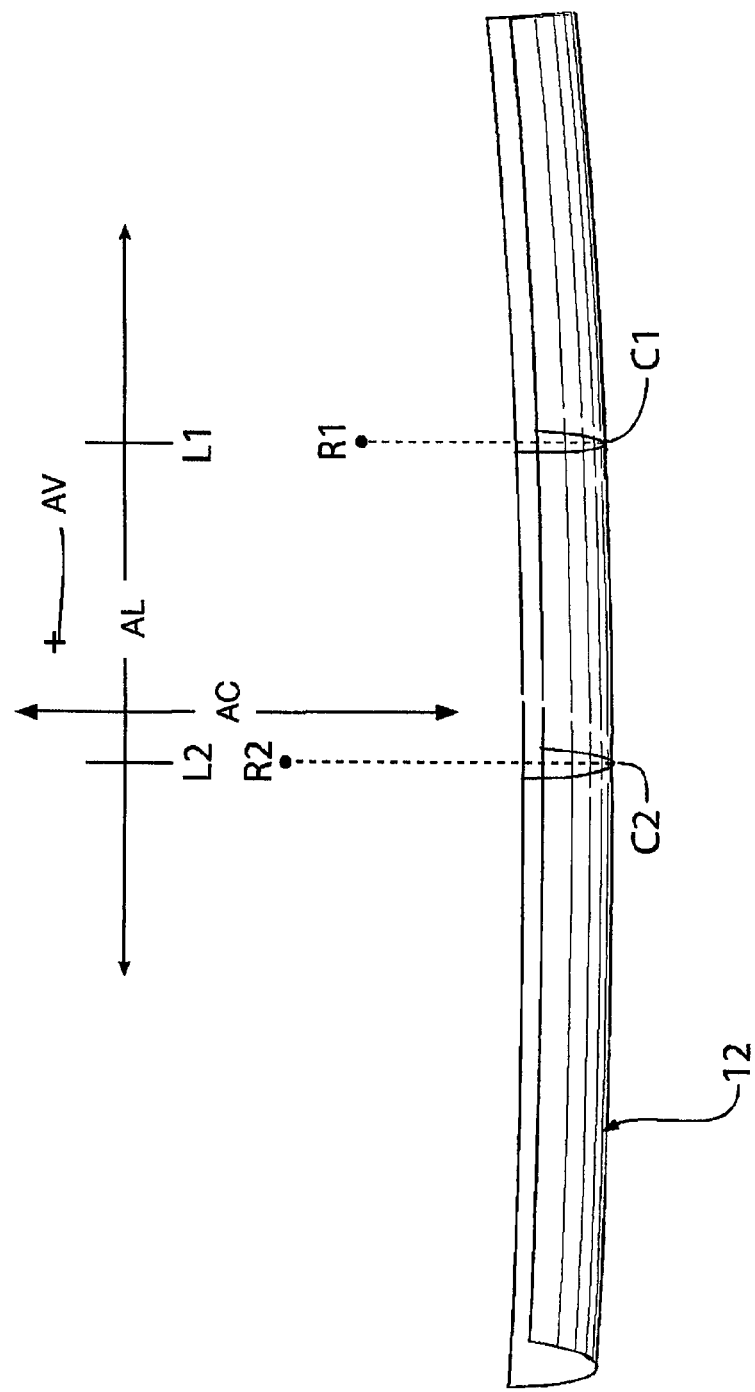
FIG. 2 is a perspective view of one of the surfaces shown in FIGS. 1A and 1B.

The class A surface 12 is shown from above in FIG. 2. As can be seen, the Class A surface 12 may be a complex shape. The surface 12 may be arcuate relative to a vertical axis AV. The surface 12 may further be arcuate about a longitudinally extending axis AL. The longitudinal axis AL is an axis that extends longitudinally relative to the vehicle (not shown). Furthermore, the surface 12 may have a radius of curvature about the longitudinal axis AL that changes with axial position. For example, at a longitudinal position L1 (which represents a forward edge 10F of the window glass 10, surface 12 (and consequently the window glass 10) may have a radius of curvature R1. At a longitudinal position L2 (which represents a rear edge 10R of the window glass 10, surface 12 (and consequently the window glass 10) may have a radius of curvature R2 which is larger than R1.

Because of the complex shape of the surface 12 and consequently the window glass 10, in order for the window glass 10 to follow the class A surface 12 and remain level at all times while moving between the closed and open positions, the window glass 10 will rotate such that there will be movement of one or both of the front and rear edges 10F and 10R relative to each other in the cross-car direction (represented by cross-car axis AC) as the window glass 10 moves up and down between the closed and open positions.

Figure 5:
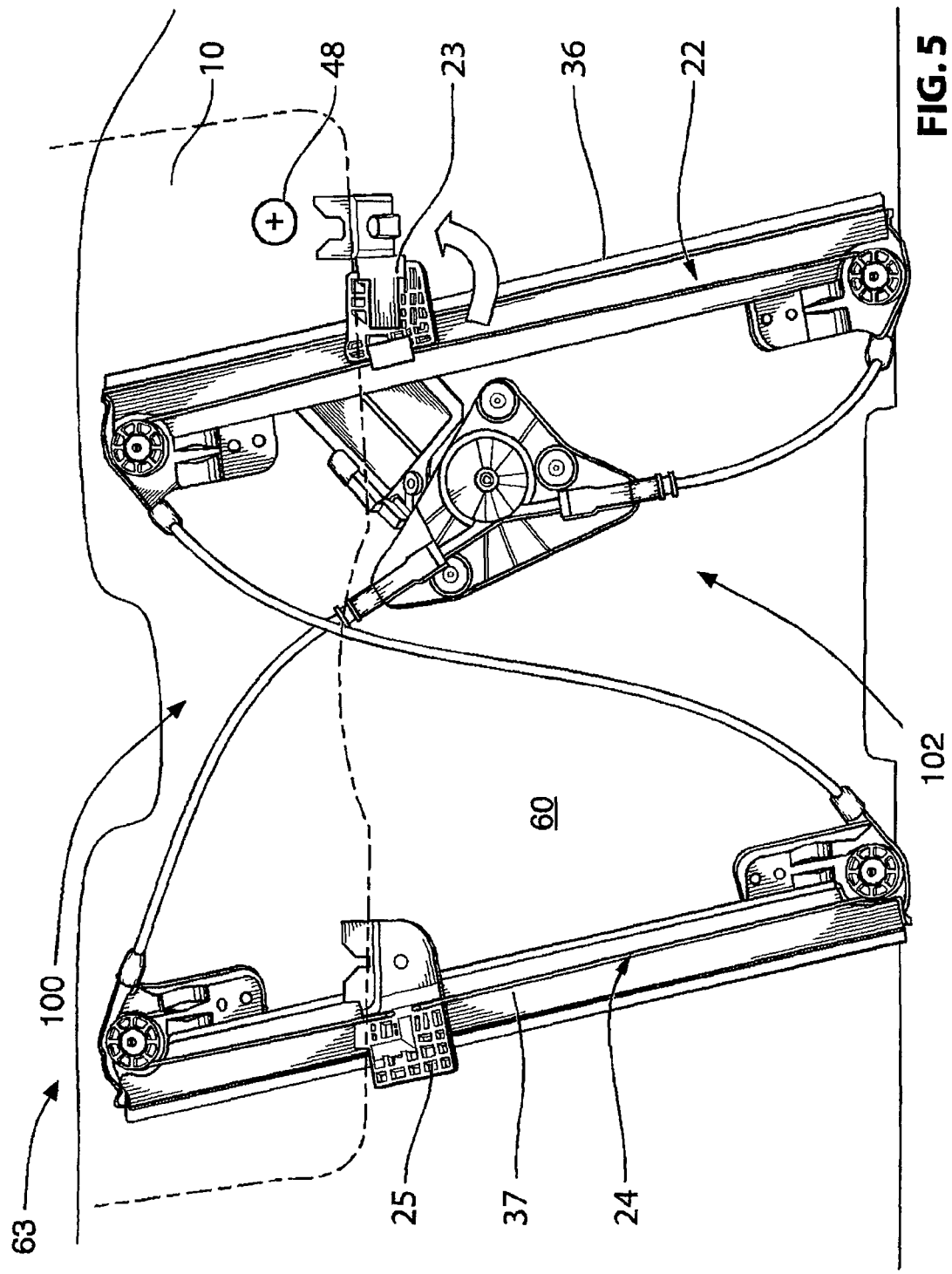
FIG. 5 is a perspective view of the window regulator module.

The movement of the window glass 10 between the open and closed positions is carried out by a window regulator 100 shown in FIG. 5. The window regulator 100 includes a first guide rail 22, which may be referred to as a front guide rail 22, a second guide rail 24, which may be referred to as a rear guide rail 24, a first lifter 23, which may be referred to as a front lifter 23, a second lifter 25, which may be referred to as a rear lifter 25, and a cable drive assembly 102. Each guide rail 22 and 24 has one of the lifters 23 and 25 thereon. The lifters 23 and 25 are movable up and down on the guide rails 22 and 24 between an upper position which corresponds to the closed position of the window glass 10 (FIG. 1) and a lower position which corresponds to the open position of the window glass 10 (FIG. 1). The lifters 23 and 25 are shown in FIG. 5 in an intermediate position somewhere between the upper and lower positions. The lifters 23 and 25 hold the window glass 10 and may be any suitable type of lifters known in the art.

The cable drive assembly 102 connects to the lifters 23 and 25 and drives the lifters 23 and 25 up and down along the guide rails 22 and 24 between the upper and lower positions. The cable drive assembly 102 may be any suitable cable drive assembly known in the art. For example, the cable drive assembly may include a motor 104, a drum 106, and a plurality of cables 108 that extend from the drum 106 around pulleys 110 or the like and connect to the lifters 23 and 25. The cables 108 are wound and unwound from the drum 106 by rotation of the motor 104 to drive the lifters 23 and 25 up and down along the guide rails 22 and 24 so as to move the window glass 10 up and down.

Figure 6A:
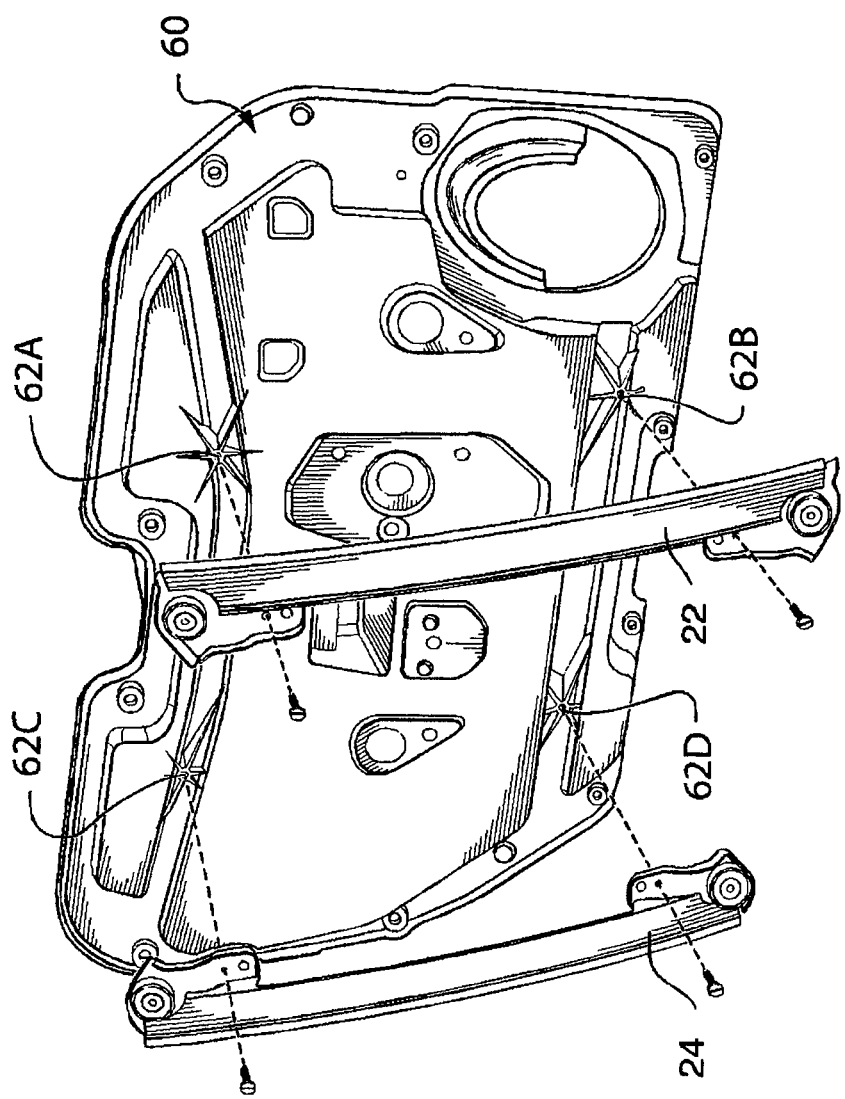
FIG. 6A is perspective view of two of guide rails and a carrier prior to mounting the guide rails to the carrier.
Figure 6B:
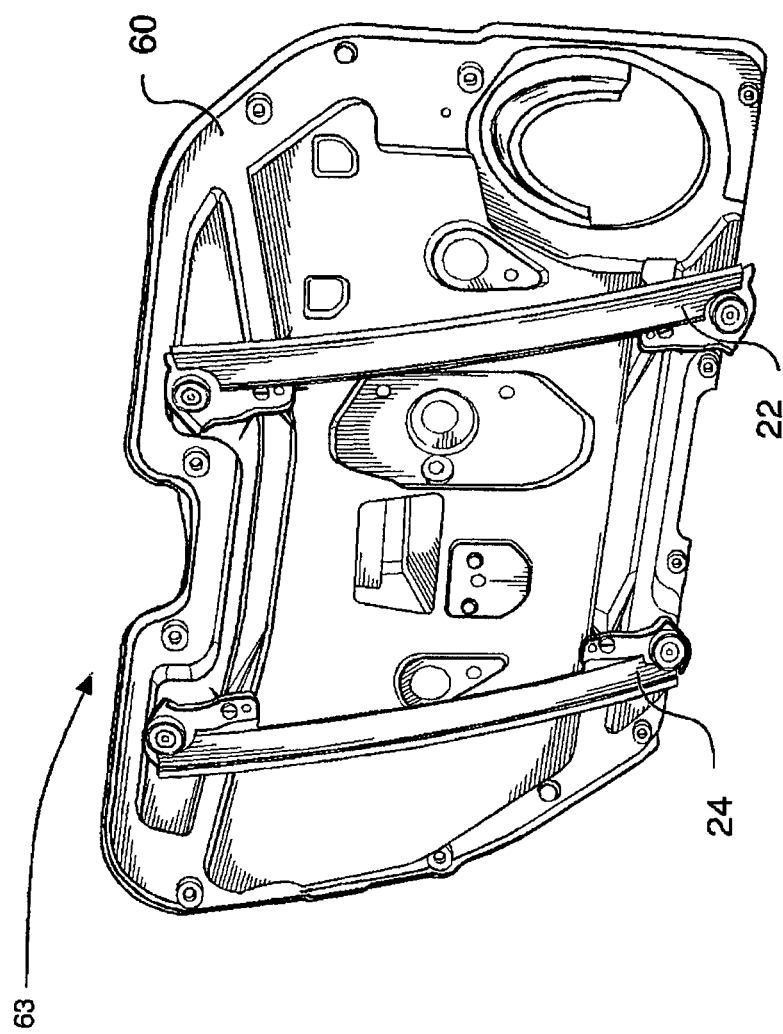
FIG. 6B is a perspective view of the two guide rails shown in FIG. 6A, mounted to the carrier shown in FIG. 6A.

The path followed by the lifters 23 and 25 is controlled by the guide rails 22 and 24. In order for the front and rear edges 10F and 10R of the window glass 10 to move in the cross-car direction as the window glass 10 moves up and down the path followed by the lifters 23 and 25 may be helical. The guide rails 22 and 24 may have a helical twist in them when they are in an installed position on a carrier 60 as shown in FIG. 6B, thereby forming a window regulator module subassembly 61. The window regulator module subassembly 61, in combination with the lifters 23 and 25 and the cable drive assembly 102 (also mounted to the carrier 60) together form a window regulator module 63 (FIG. 5). Optionally other components that are intended to be within the vehicle door may also be mounted to the carrier 60, such as a door latch (not shown).

In order to control the cost of the guide rails 22 and 24, the guide rails 22 and 24 may be manufactured without any helical twist. Instead, the carrier 60 may be configured to force the guide rails 22 and 24 to take on a selected helically twisted position when the guide rails 22 and 24 are mounted to the carrier 60 and to hold the guide rails 22 and 24 in the selected helically twisted position. For greater clarity, it will be noted that the selected helically twisted position for the guide rail 22 may be different than the selected helically twisted position for the guide rail 24.

Figure 8:
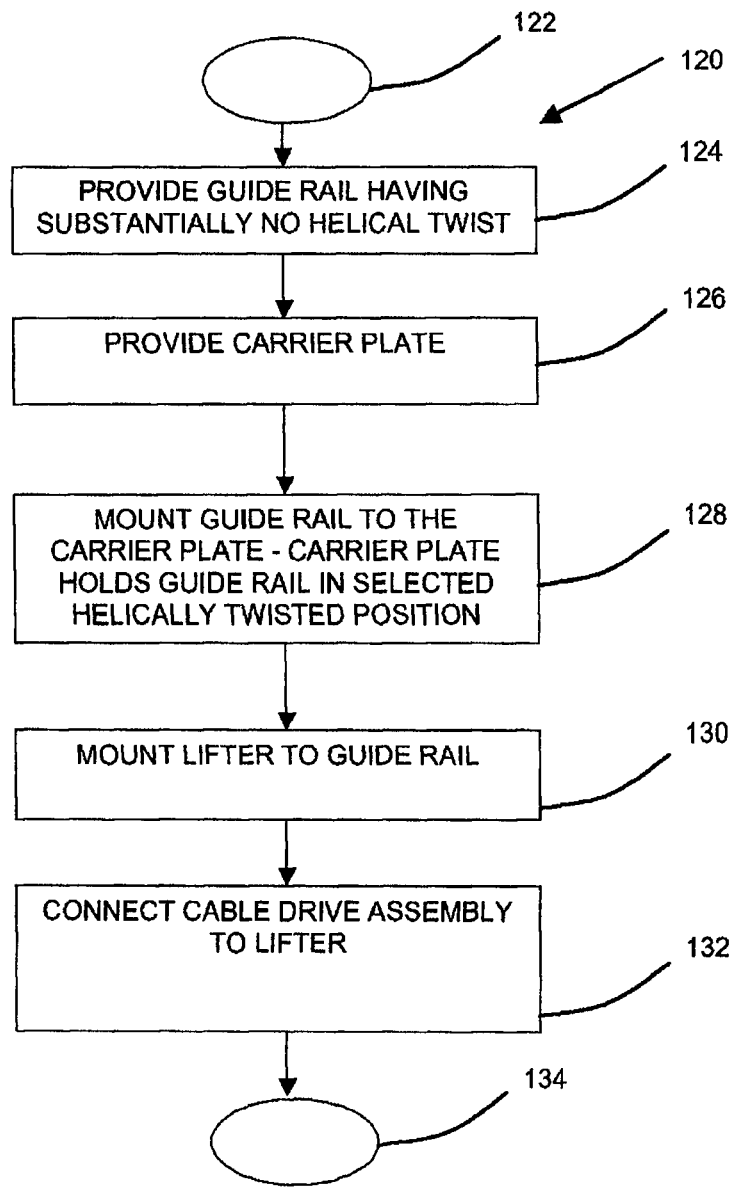
FIGS. 8-11 are flow diagrams illustrating steps in the manufacture of a window regulator module shown in FIG. 5.

The method by which the window regulator module 63 is made is shown at 120 in FIG. 8. The method 120 starts at 122. At step 124, a guide rail 22 or 24 is provided, having substantially no helical twist. The guide rail 22 or 24 may be manufactured using any suitable technique. For example, referring to FIG. 3A, the guide rail 22 or 24 may be manufactured so that it has a longitudinal axis shown at 30 that is arcuate. The arcuate axis 30 may, for example, extend along a generally circular path (in the sense that the axis 30 may follow a portion of the perimeter of a circle having a suitable substantially uniform radius R). To provide the arcuate longitudinal axis 30 for the guide rail 22 or 24, the guide rail 22 or 24 may be manufactured by a sheet forming process wherein the guide rail 22 or 24 passes through a nip between two counter-rotating rollers or drums (not shown). This process may result in the arcuate shape to the guide rail 22 or 24.

The guide rail 22 or 24 may be made from any suitable material, such as a suitable metal, such as a suitable steel.

Referring to FIG. 8, at step 126, the carrier plate 60 (FIG. 6A) is provided. The carrier plate 60 may be made from any suitable material, such as a polymeric material such as a glass filled nylon.

At step 128 (FIG. 8), the guide rail 22 or 24 is mounted to the carrier plate 60, thereby forming the window regulator module subassembly 61 (FIG. 6B), at which point the carrier plate 60 holds the guide rail 22 or 24 in the selected helically twisted position.

At step 130, a lifter 23 or 25 is mounted to the guide rail 22 or 24 (FIG. 5). This step may occur after step 128 or in some instances before step 128, or at any other suitable time. At step 132, the cable drive assembly 102 is connected to the lifter 23 or 25 to permit driving of the lifter 23 or 25 along the guide rail 22 or 24. The method ends at 134.

In an embodiment, when the carrier plate 60 holds the guide rail 22 or 24 in the selected helically twisted position, the carrier plate 60 resists a restoring force on the guide rail 22 or 24 that urges the guide rail 22 or 24 back to its original not-helically twisted position. It will be understood that the restoring force causes some deflection of the carrier plate 60. In the same way that the carrier plate 60 causes a deflection of the guide rail 22 or 24 away from a rest position (i.e. a not-helically twisted position) to the selected helically twisted position, the restoring force in the guide rail 22 or 24 causes a deflection of the carrier plate 60 away from a rest position to a final position, which is an equilibrium position in which it holds the guide rail 22 or 24 in the selected helically twisted position. Thus, the carrier plate 60, in such embodiments, is manufactured having a rest position, and when it is connected to the guide rail 22 or 24 the carrier plate 60 and the guide rail 22 or 24 are both brought away from their respective rest positions to an equilibrium position wherein the guide rail 22 or 24 is kept in the selected helically twisted position. The rest position for the guide rail 22 or 24 may be, as noted above, a not-helically twisted position, and it may have any selected amount of circular curvature along its length (including a curvature of zero, if desired).

Figure 9:
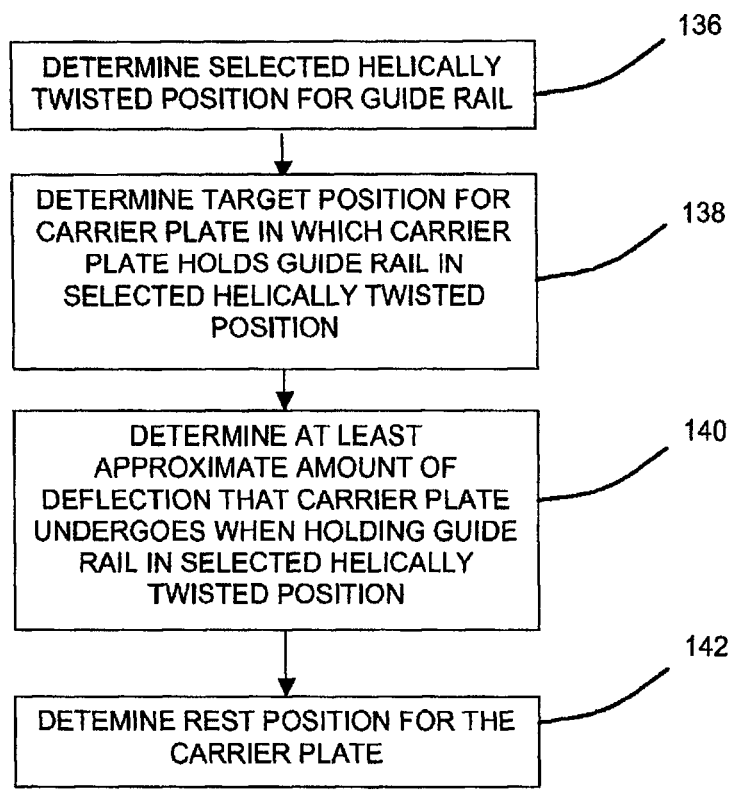

To determine what the rest position of the carrier plate 60 would be in order to join to the guide rail 22 or 24 and reach the desired equilibrium position, the following steps shown in FIG. 9 may be carried out. At step 136, the selected helically twisted position for the guide rail 22 or 24 is determined. At step 138, a target position for the carrier plate 60 is determined. The target position is the equilibrium position in which the carrier plate 60 holds the guide rail 22 or 24 in the selected helically twisted position. At step 140, a determination is made for an at least approximate amount of deflection that the carrier plate 60 undergoes when holding the guide rail 22 or 24 in the selected helically twisted position and resisting restoring forces in the guide rail 22 or 24. At step 142, a rest position for the carrier plate 60 is determined, from which the carrier plate 60 is deflected by the guide rail 22 or 24 to at least approximately reach the target position, based on the at least approximate amount of deflection determined in step 140. The carrier plate 60 that is provided in step 126 (FIG. 8) may be manufactured to have the rest position determined in step 142.

Figure 3B:
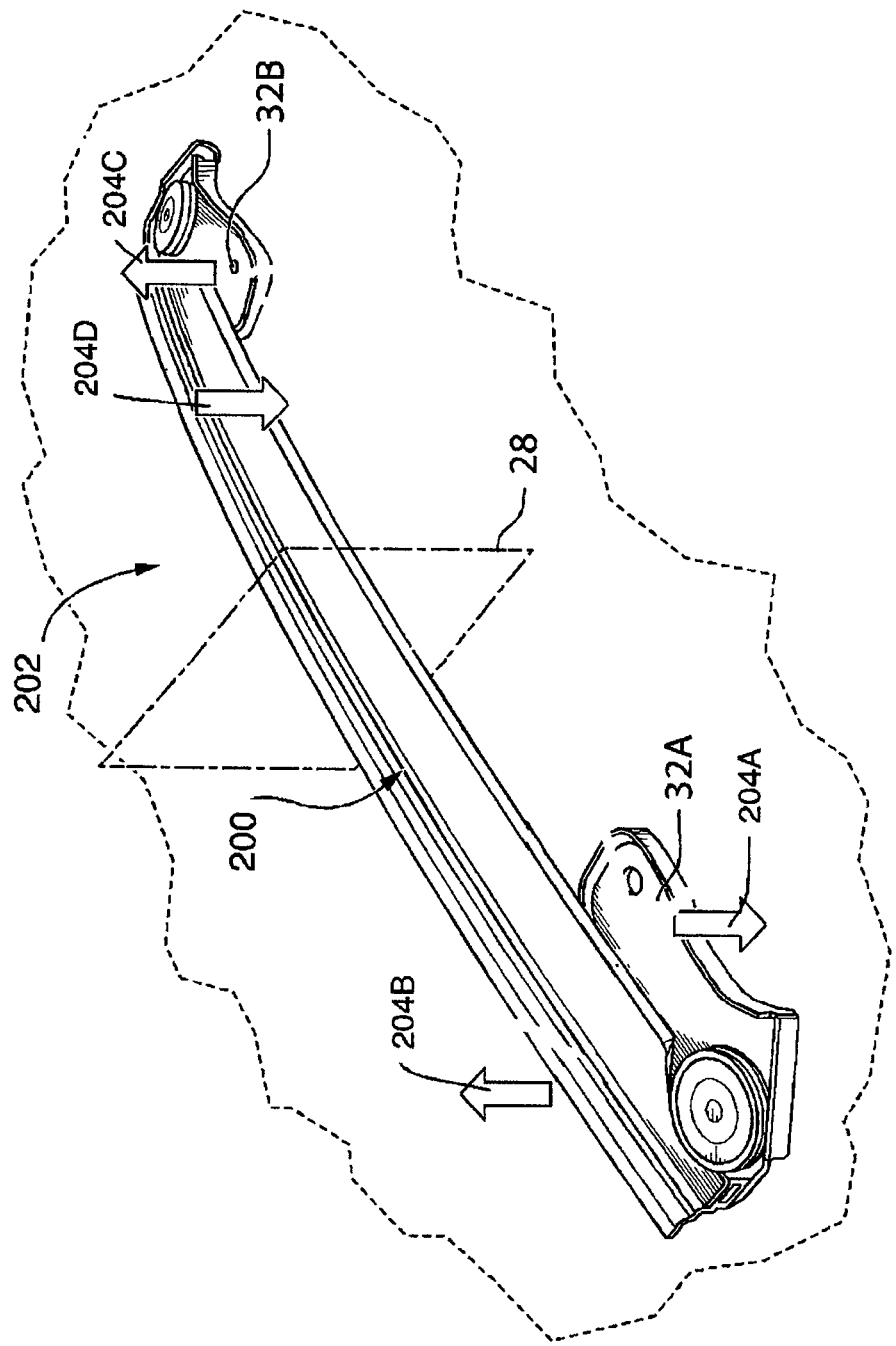
FIG. 3B is an illustration of a virtual model of the guide rail and a virtual model of the carrier plate shown in FIG. 3A.
Figure 4A:
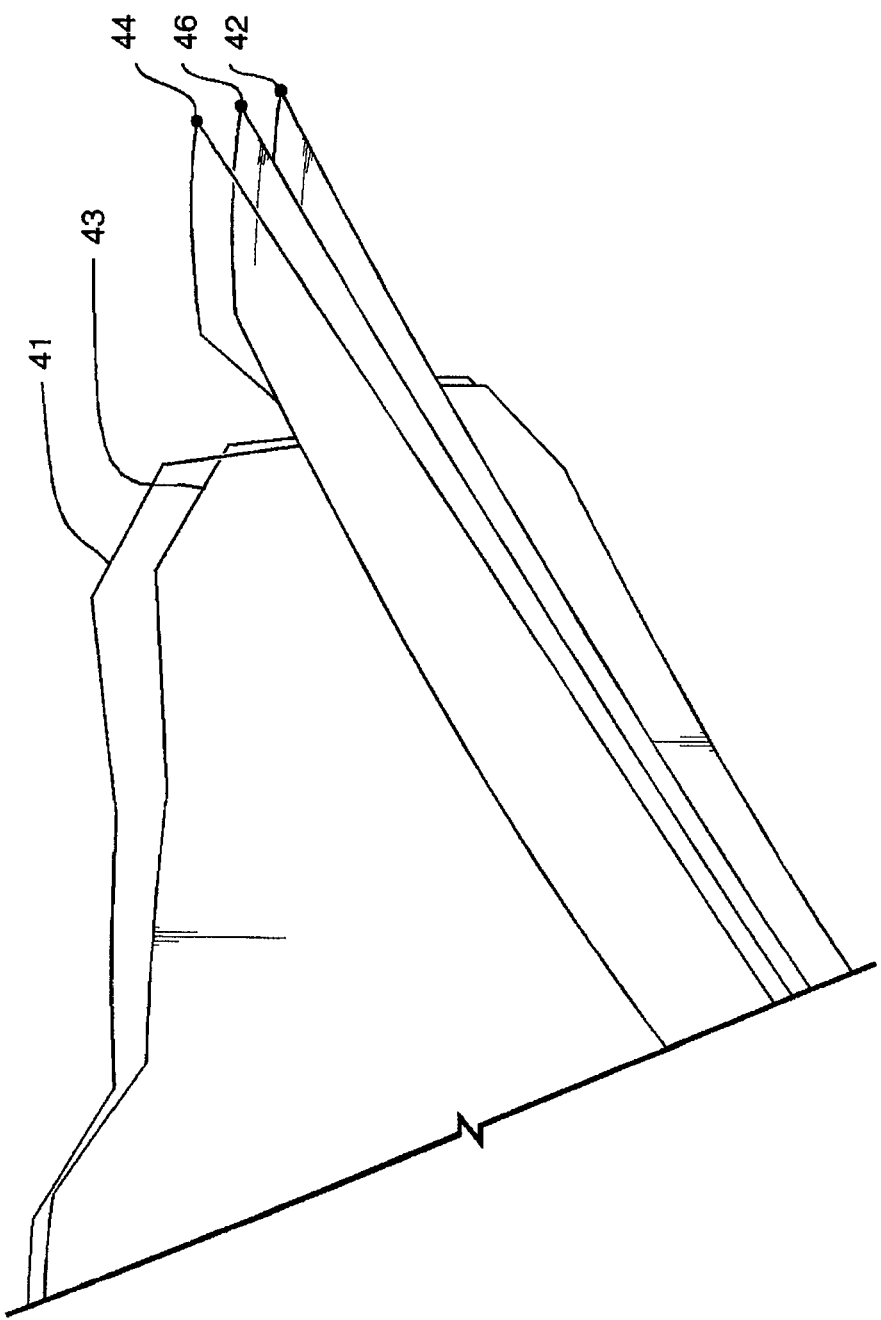
FIG. 4A is a diagram illustrating the result of mounting the virtual model of the guide rail to the virtual model of the carrier plate.
Figure 10:
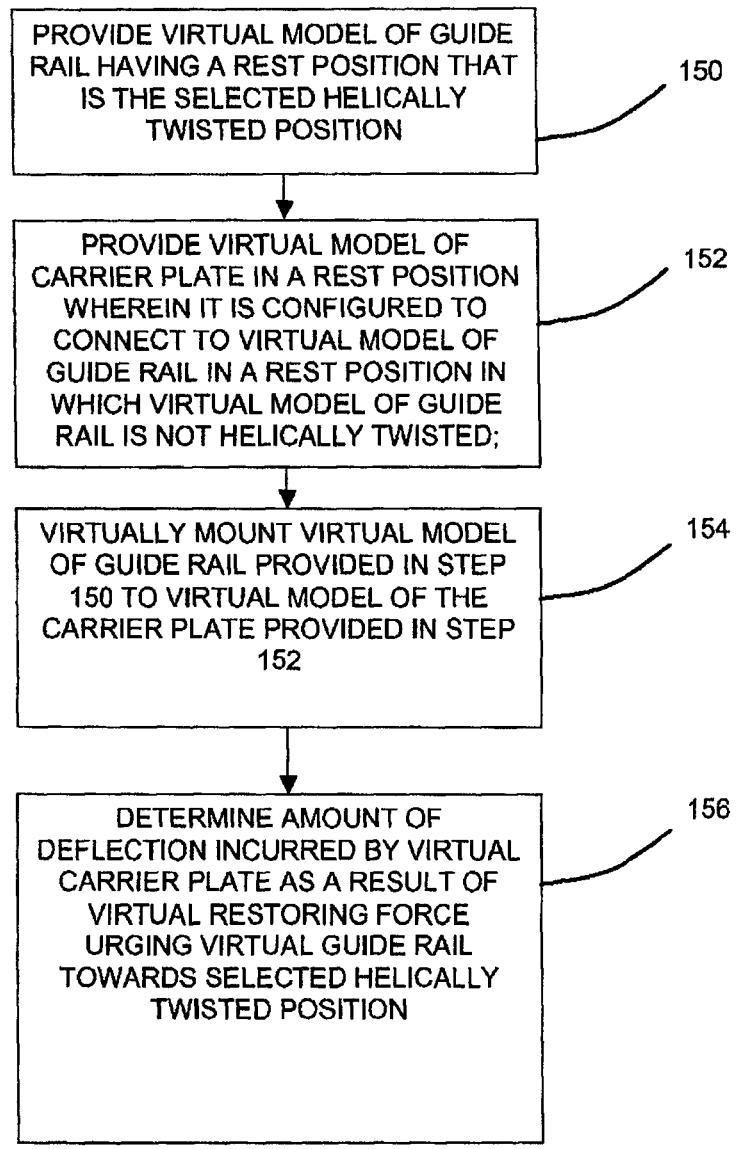

Steps for carrying out step 140 (i.e. determining the amount of deflection that the carrier plate 60 undergoes) may be as shown in FIG. 10. The steps include step 150 wherein a virtual model 200 (FIG. 3B) of the guide rail 22 or 24 (which may be referred to as a virtual guide rail 200 for simplicity) is provided having a rest position that is the selected helically twisted position. The virtual model 200 may be provided and manipulated on a computer that includes a processing unit, a memory, an input device (e.g. mouse and keyboard, and/or touchscreen) and an output device, such as a display. While none of the aforementioned hardware is shown suitable examples of such hardware will be readily apparent to one skilled in the art. At step 152, a virtual model 202 of the carrier plate 60 (which may be referred to as a virtual carrier plate 202 for simplicity) is provided having a rest position wherein the virtual model 202 of the carrier plate 60 is configured to connect to the virtual guide rail 200 that is configured to have a rest position in which the virtual guide rail 200 is not helically twisted. At step 154, the virtual guide rail 200 provided in step 152 (i.e. having the rest position in the selected helically twisted position) is virtually mounted to the virtual carrier plate 202 provided in step 154. FIG. 4A shows several planes that represent the virtual carrier plate 202 and the virtual guide rail 200 in several states or positions. The plane shown at 42 represents the virtual guide rail 200 in its rest position (i.e. the selected helically twisted position). The plane 44 represents the virtual guide rail 200 in a position wherein it would have no helical twist. This is the position in which the virtual carrier plate 202 is positioned to mate with when the virtual carrier plate 202 is in its rest position. This rest position of the virtual carrier plate 202 is represented by plane 41. The planes 46 and 43 represent the virtual guide rail 200 and the virtual carrier plate 202 respectively, when in the equilibrium position that results when the virtual guide rail 200 and the virtual carrier plate 202 are connected together. The arrows shown in FIG. 3B at 204A, 204B, 204C and 204D represent the twisting forces exerted on the virtual guide rail 200 by the virtual carrier plate 202 in the scenario described in relation to FIG. 4A.

As can be seen by the difference in the positions of the planes 41 and 43 the virtual restoring force in the virtual guide rail 200 has caused a deflection of the virtual carrier plate 202. A determination of this deflection is made in step 156. This deflection may be used as an estimate of the deflection in step 140. It will be understood, however, that the scenario shown in FIG. 4A is not identical to a scenario in which the carrier plate 60 holds the guide rail 22 or 24 in a selected helically twisted position from a non-helically twisted rest position. The measured deflection in the scenario represented in FIG. 4A may, however, serve as a suitable preliminary estimate for the deflection sought to be determined in step 140.

Figure 4B:
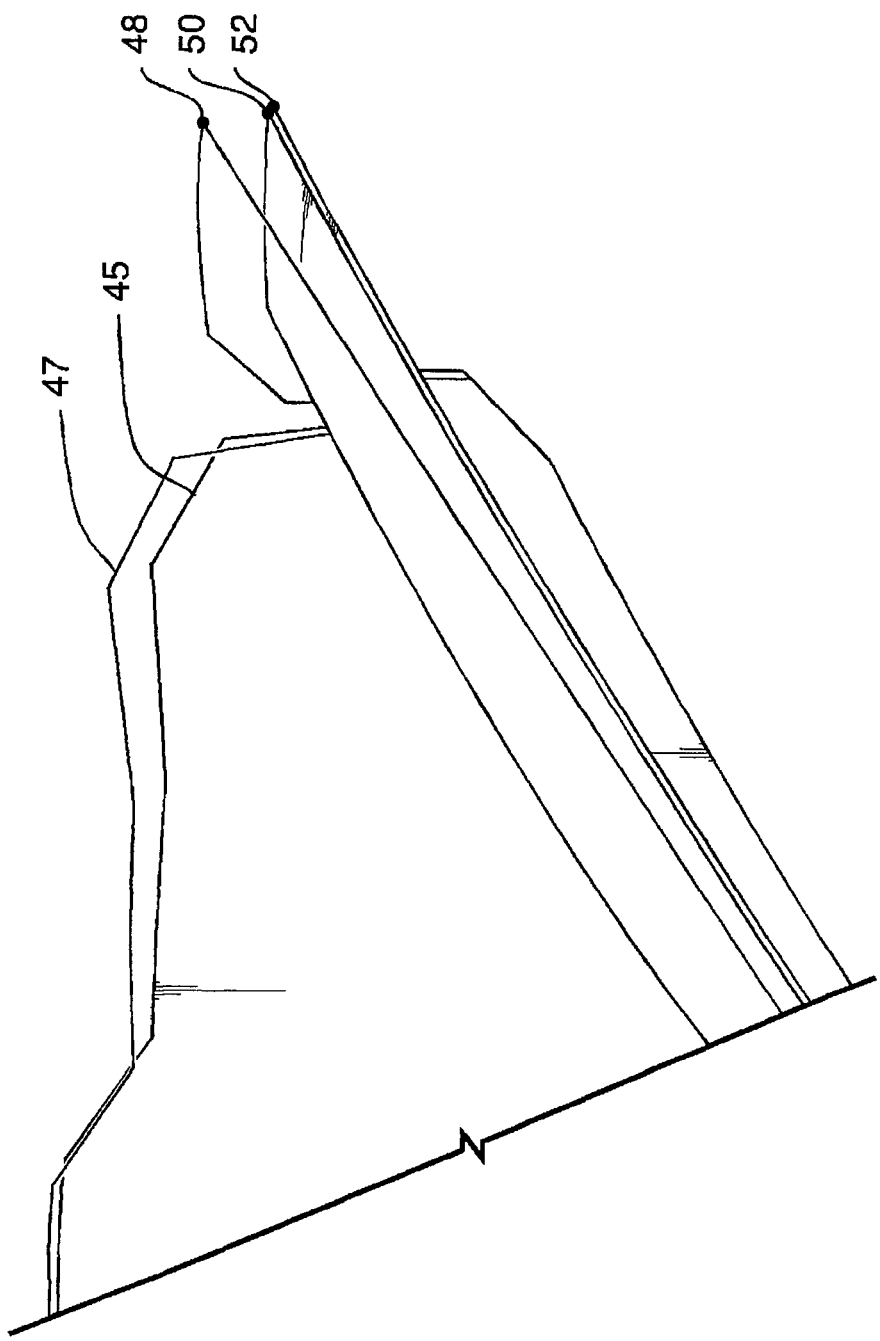
FIG. 4B is a diagram illustrating the result of mounting adjusted versions of the virtual model of the guide rail to the virtual model of the carrier plate.
Figure 11:
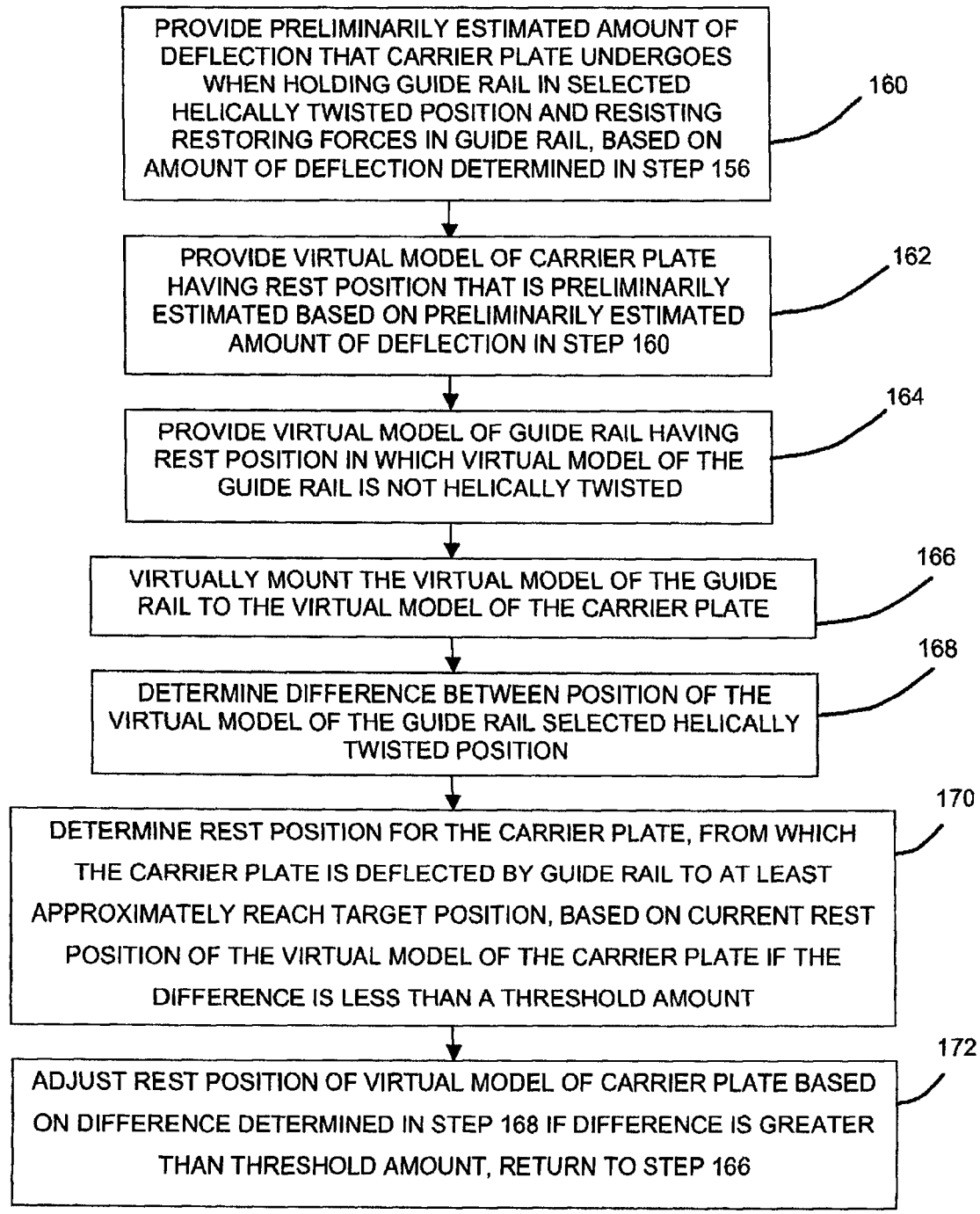

To refine this preliminary estimate, the virtual models 200 and 202 may be revised to have different rest positions. FIG. 11 shows steps that may be carried out to refine the determination of the deflection. For the steps shown in FIG. 11, reference is made to FIG. 4B. At step 160, a preliminarily estimated amount of deflection that the carrier plate 60 undergoes when holding the guide rail 22 or 24 in the selected helically twisted position and resisting restoring forces in the guide rail 22 or 24 is provided, based on the amount of deflection determined in step 156. This preliminarily estimated amount of deflection may be the amount of deflection determined in step 156 unaltered. Alternatively, the amount of deflection 156 may be altered in some way in order to arrive at the preliminary estimated amount of deflection provided in step 160. The preliminary estimate of the deflection may be used to provide a preliminary estimate of a rest position for the carrier plate 60 that, when holding the actual guide rail 22 or 24, would result in an equilibrium position that is the selected helical twisted position for the guide rail 22 or 24. The preliminary estimate for the rest position for the carrier plate 60 may be the position of the carrier plate 60 in the desired equilibrium position adjusted away from the rest position of the guide rail 22 or 24 by the deflection provided in step 160. At step 162, the virtual carrier plate 202 is provided having the preliminarily estimated rest position (which may be, as noted, based on the preliminarily estimated amount of deflection provided in step 160). This rest position for the virtual carrier plate 202 is represented in FIG. 4B by plane 45. At step 164 (FIG. 11), the virtual guide rail 200 is provided having a rest position in which the virtual guide rail 200 is not helically twisted (and therefore is representative of the rest position of the actual rest position of the guide rail 22 or 24 that will be provided in step 124 in FIG. 8. This rest position for the virtual guide rail 200 is represented in FIG. 4B by plane 48. At step 166, the virtual guide rail 200 provided in step 164 is virtually mounted to the virtual carrier plate 202 provided in step 162. As a result, the virtual guide rail 200 and the virtual carrier plate 202 will both be deflected from their respective rest positions to reach an equilibrium position represented by plane 50 for the virtual guide rail 200 and plane 47 for the virtual carrier plate 202. Plane 52 in FIG. 4B represents the virtual guide rail 200 in the selected helically twisted position. As can be seen, the preliminarily estimated rest position for the virtual carrier plate 202 brought the virtual guide rail 200 to a position that is close to the selected helically twisted position, but which is not precisely the same position. In step 168, the difference between the selected helically twisted position and the equilibrium position of the virtual guide rail 200 resulting from the mounting carried out in step 166 is determined. In step 170, if the difference determined in step 168 is less than a threshold amount (e.g. 0.03 mm), then the rest position preliminarily estimated when providing the virtual carrier plate 202 in step 162 may be used for the manufacture of the actual carrier plate 60.

Figure 3A:
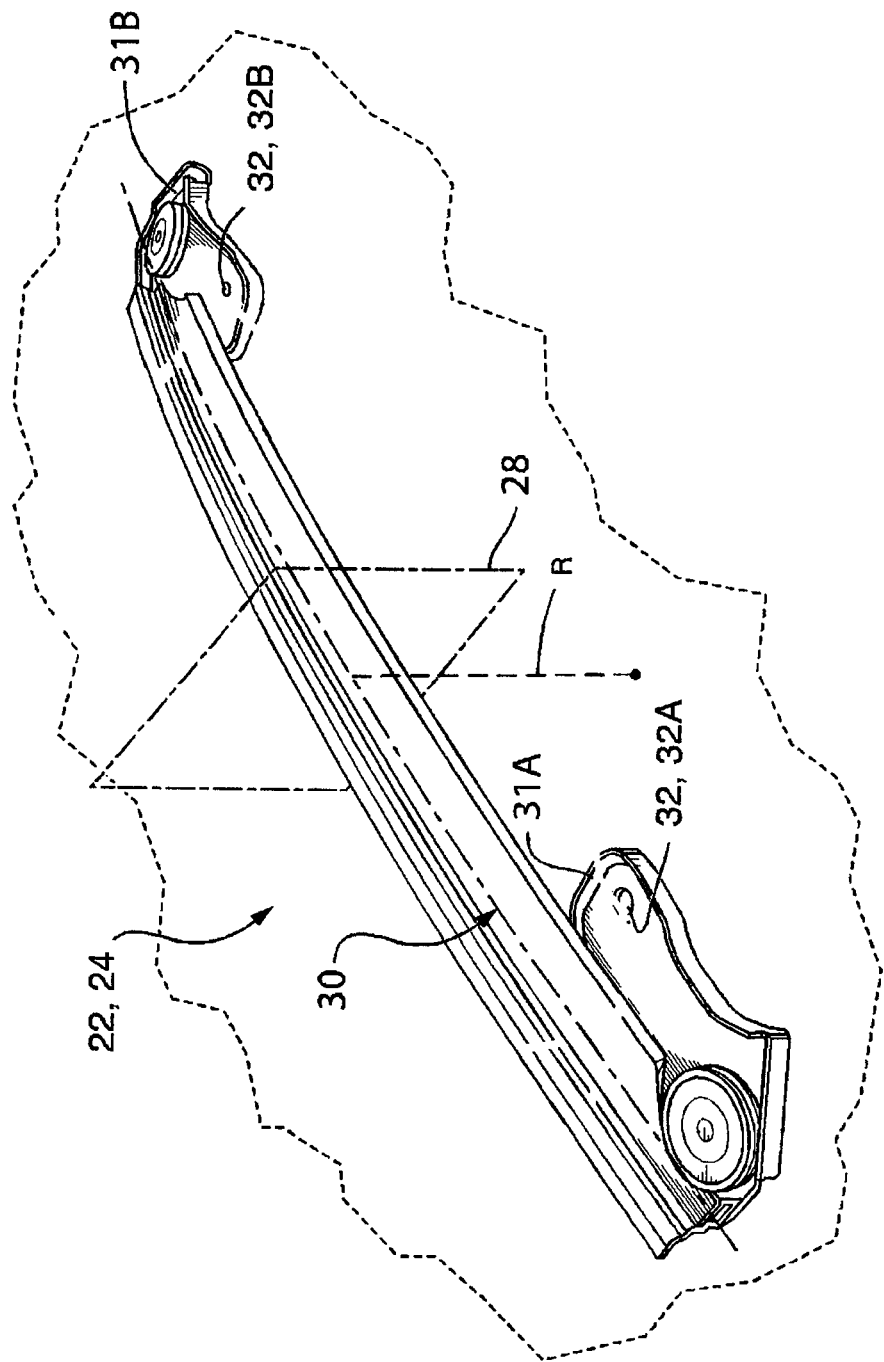
FIG. 3A is a magnified perspective view of a guide rail and a portion of a carrier plate for use in the window regulator module.

If, however, the difference determined in step 168 is larger than the threshold amount, then the rest position of the virtual carrier plate 202 may be adjusted based on the difference, in step 172, and steps 166 and 168 may be repeated iteratively until the adjustment in the rest position of the virtual carrier plate 202 results in a difference that is less than the threshold amount and step 170 can then be carried out, and the actual carrier plate 60 can be provided in step 126, with suitable mounting points 32 (two examples of which are shown individually at 32A and 32B in FIG. 3A). The mounting points 32 are arranged so that fasteners (which may be fasteners of any suitable type) may be passed through apertures in the guide rail 22 or 24 and into the carrier plate 60 at those mounting points 32 to affix the guide rail 22 or 24 to the carrier plate 60.

By manufacturing the carrier plate 60 having the rest position determined as described above, a suitable helical twist can be provided in the guide rail 22 or 24. The method described above may be used first for guide rail 22, and then again for guide rail 24. Alternatively it may be used for both guide rails simultaneously. As a result of the method described above, the two guide rails 22 and 24 may be manufactured using the same tooling and may thus be identical initially (i.e. having no helical twist) but can be made to acquire two different selected helically twisted positions when mounted to the carrier plate 60, which facilitate the movement up and down thereon by the lifters 21 and 23 (FIG. 5).

Figure 7:
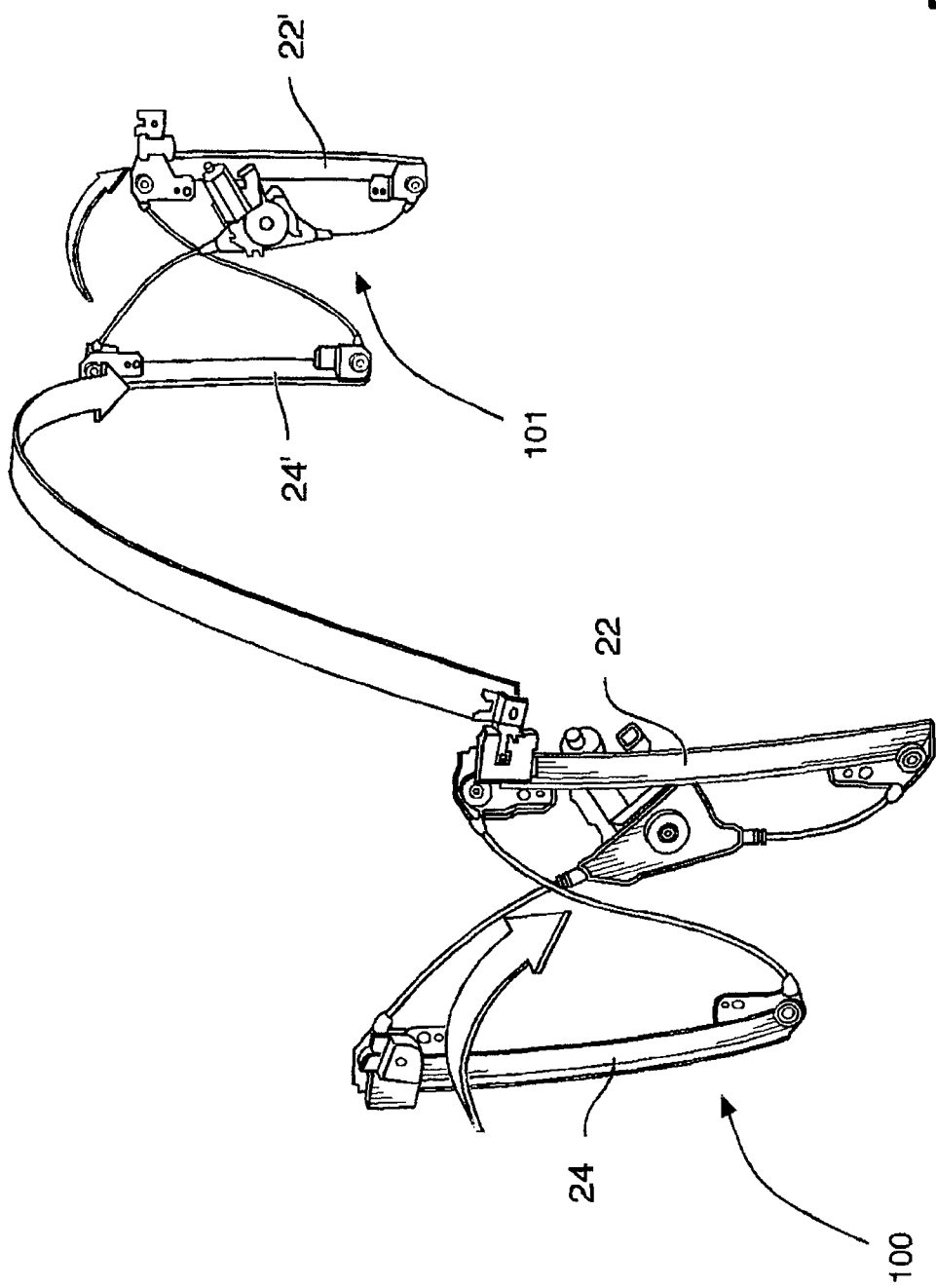
FIG. 7 is a perspective view of a plurality of window regulators.

As shown in FIG. 3A, the guide rail 22 or 24 may be configured to be symmetrical about transverse plane 28 and may have mounting brackets 31A and 31B that are mirror images of each other. Moreover, in some embodiments the carrier plate 60 may be configured so that the twisting forces that it exerts on the guide rail 22 or 24 (to provide the selected helical twisted position in the guide rail 22 or 24) are polar symmetrical about a center point of the guide rail 22 or 24. In reference to FIG. 7, an advantage of such symmetry in the guide rail 22 or 24 and in the twisting forces is that one configuration of guide rail 22 or 24 can more easily be adapted for use in several positions on the carrier 60. For example, the guide rail 24 is shown as being provided for window regulator 100, and it has a selected helically twisted position as a result of the carrier plate 60 (not shown in FIG. 7). A copy of guide rail 24 is rotated and helically twisted in a different way for use as guide rail 22 in the window regulator 100. Another copy of guide rail 24 is provided and is rotated and helically twisted in a different way via a carrier plate that is not shown (e.g. in a mirrored way relative to guide rail 24) for use as guide rail 24' on a vehicle door (not shown) on the opposite side of the vehicle (not shown), for use in window regulator 101. Yet another copy of guide rail 24 is provided and is rotated and helically twisted in a different way (e.g. in a mirrored way relative to guide rail 22) for use as guide rail 22' for the window regulator 101 on the aforementioned other vehicle door.

Thus, the same guide rail may be used in four places, instead of having to provide four different guide rails. This can result in lower tooling costs and lower costs overall in relation to the manufacture of a window regulator module.

Thus, a window regulator module kit may be provided that has at least one guide rail 22 or 24 that has a rest position in which it is not helically twisted, a carrier 60 configured to bring the guide rail 22 or 24 to the selected helically twisted position, a lifter 21 or 23 and a cable drive assembly 102. The kit may include two guide rails (e.g. guide rails 22 and 24), which are substantially identical to each other initially (i.e. neither of them has any helical twist), but which mount to the carrier 60 and take on different selected helically twisted positions.

It will be appreciated that other modifications and variations may be made to the embodiments described herein without departing from the fair scope of the appended claims.

We claim:

1. A window regulator module kit, comprising:
   a guide rail having a rest position with substantially no helical twist;
   a carrier plate having a selected mounting arrangement configured to bring the guide rail to take on and hold a selected helically twisted position by exerting a twisting force on the guide rail by the carrier plate when the guide rail is mounted to the carrier plate;
   a lifter mountable to the guide rail, wherein the lifter is configured to hold a window glass; and
   a cable drive assembly connectable to the lifter so as to slide the lifter along the arcuate rail.

2. The window module kit as claimed in claim 1, wherein the guide rail is made from a metal and the carrier is made from a polymeric material.

3. The window module kit as claimed in claim 1, wherein the guide rail has a substantially uniform radius of curvature.

4. The window module kit as claimed in claim 1, wherein the guide rail is a first guide rail and wherein the door module kit further comprises a second guide rail that is substantially identical to the first guide rail, and wherein the mounting arrangement is a first mounting arrangement and the carrier plate has a second mounting arrangement configured to hold the second guide rail in a helically twisted position that is different than the selected helically twisted position of the first guide rail.

5. The window module kit as claimed in claim 1, wherein the carrier plate resists a restoring force urging the guide rail back to the rest position.

6. The window module kit as claimed in claim 1, wherein the restoring force provides a deflection in the carrier plate away from a rest position of the carrier plate to a final position of the carrier plate.

* * * * *